United States Patent [19]

Nakajima et al.

[11] Patent Number: 5,237,550
[45] Date of Patent: Aug. 17, 1993

[54] RELOADABLE OPTICAL RECORDING/REPRODUCING APPARATUS

[75] Inventors: Yoshio Nakajima, Higashimurayama; Akira Shirai, Hachioji, both of Japan

[73] Assignee: Olympus Optical Co., Ltd., Tokyo, Japan

[21] Appl. No.: 705,046

[22] Filed: May 23, 1991

[30] Foreign Application Priority Data

May 24, 1990 [JP] Japan .................................. 2-136045
Dec. 14, 1990 [JP] Japan .................................. 2-402342

[51] Int. Cl.$^5$ .......................... G11B 5/09; G11B 20/10
[52] U.S. Cl. .......................................... 369/48; 369/54
[58] Field of Search .................................. 369/48-59, 369/32, 41, 116, 47; 235/454, 455

[56] References Cited

U.S. PATENT DOCUMENTS

| | | | |
|---|---|---|---|
| 4,519,056 | 5/1985 | Kimoto et al. | 369/58 |
| 4,672,597 | 6/1987 | Yamazaki | 369/59 |
| 4,695,993 | 9/1987 | Takagi et al. | 369/54 |
| 4,821,254 | 4/1989 | Satoh et al. | 369/58 |
| 4,835,757 | 5/1989 | Abiko | 369/54 |
| 4,835,759 | 5/1989 | Saito et al. | 369/48 X |
| 4,866,692 | 9/1989 | Saito et al. | 369/59 |
| 4,896,311 | 1/1990 | Ishihara | 369/50 |
| 5,005,164 | 4/1991 | Sakamoto et al. | 369/48 |
| 5,054,017 | 10/1991 | Hiroyoshi et al. | 369/58 X |
| 5,182,740 | 1/1993 | Mizokami et al. | 369/47 |

FOREIGN PATENT DOCUMENTS 63-4476 1/1988 Japan .

OTHER PUBLICATIONS

"DELA Standard Optical Memory Cards and Devices, Part 4—Logical Data Structures", Drexler European Licensees Association Standard (DELA), Part 4—Rev. D, pp. 5-27.

*Primary Examiner*—Aristotelis Psitos
*Assistant Examiner*—Thang V. Tran
*Attorney, Agent, or Firm*—Armstrong, Westerman, Hattori, McLeland & Naughton

[57] ABSTRACT

A reloadable optical recording/reproducing apparatus for reloading data continuously from a recording area of a recording medium, onto which data has been recorded at the preceding recording operation, in accordance with the same modulating rule, the reloadable optical recording/reproducing apparatus comprising: a VFO circuit in which a reading VFO signal is obtained from a read signal obtained from a fact that an optical head scans an optical card; a demodulating circuit for demodulating the read signal and outputting demodulated data; a terminal recognizing device for detecting a synchronizing pattern of the terminal of the recording area, onto which data has been recorded at the preceding recording operation, from the demodulated data and outputting a terminal signal; a delay compensating device for proceeding the phase of the reading VFO signal at the timing defined in accordance with the terminal signal so as to output it as a writing VFO signal; a modulating device for modulating data to be reloaded in accordance with the writing VFO signal; and a laser diode drive circuit for performing reloading by driving the optical head in accordance with the output from the modulating circuit.

14 Claims, 14 Drawing Sheets

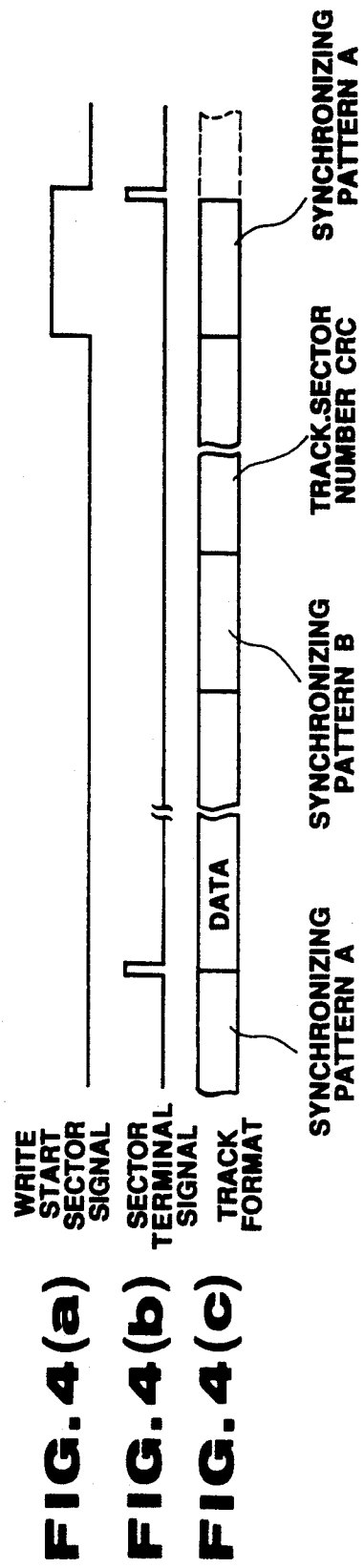

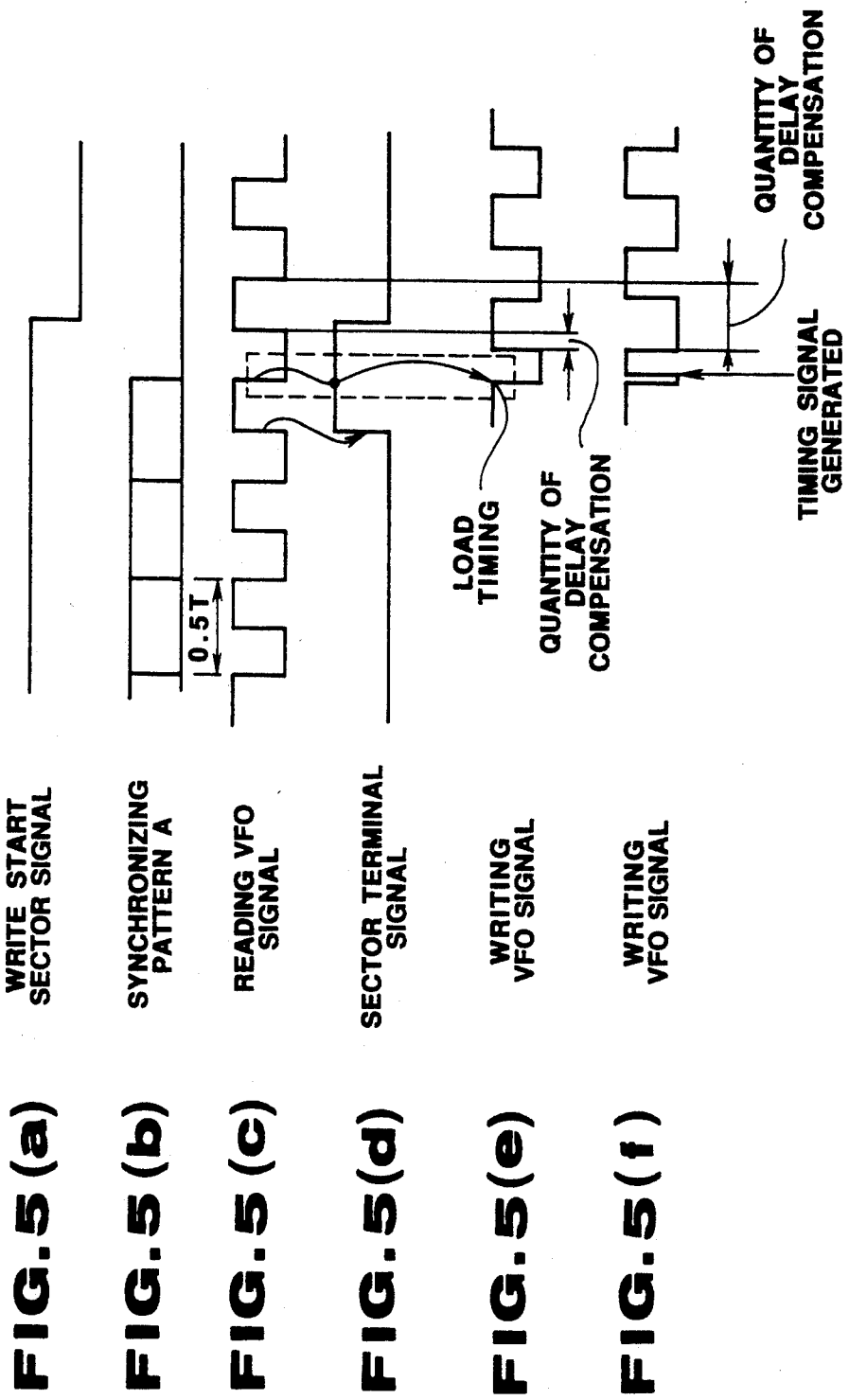

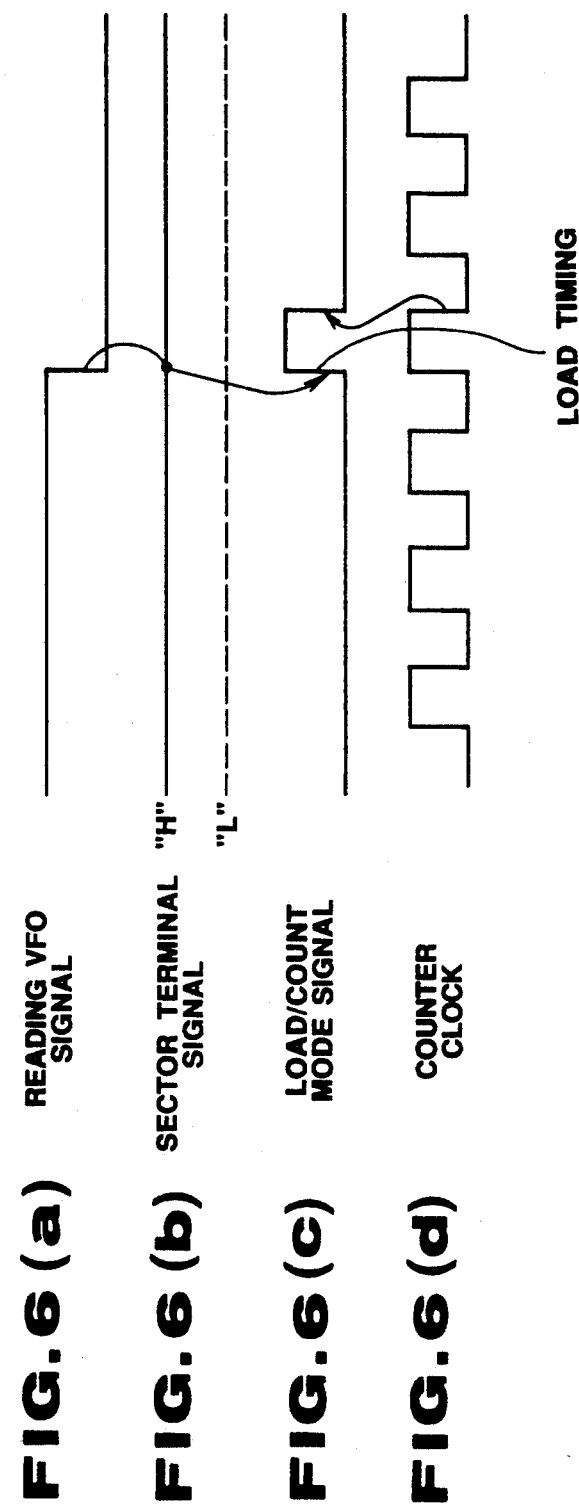

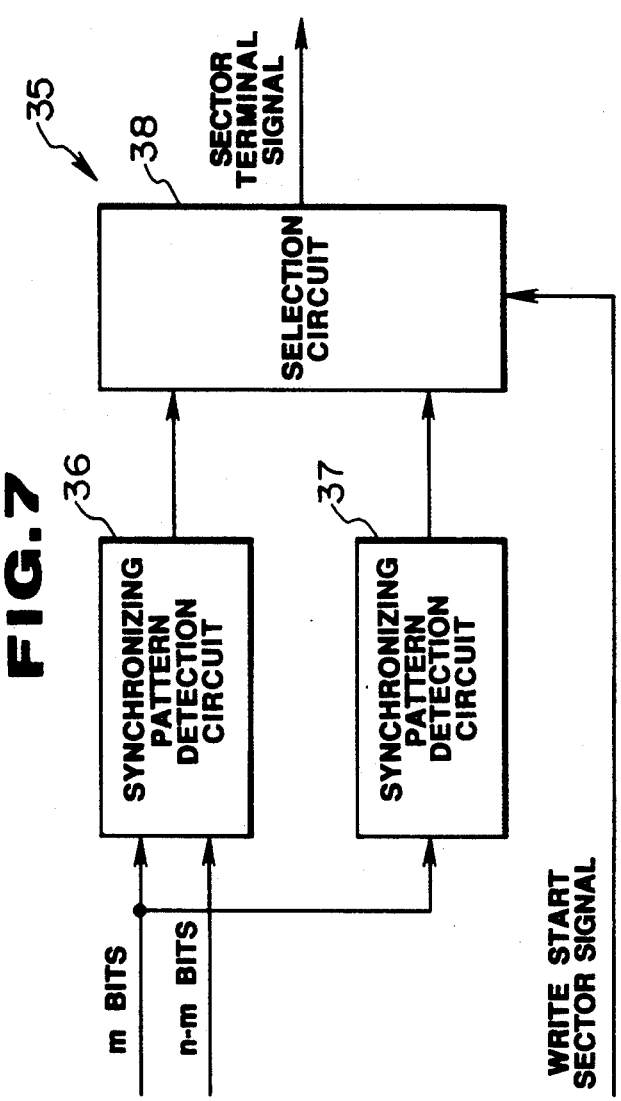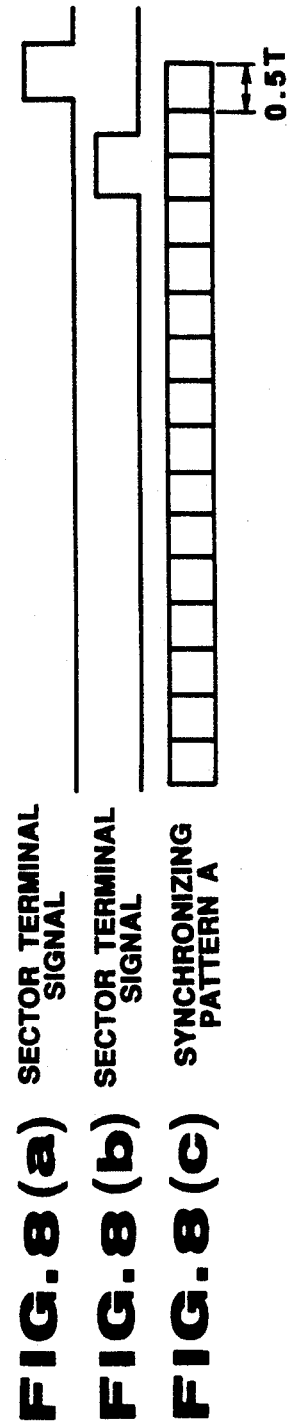

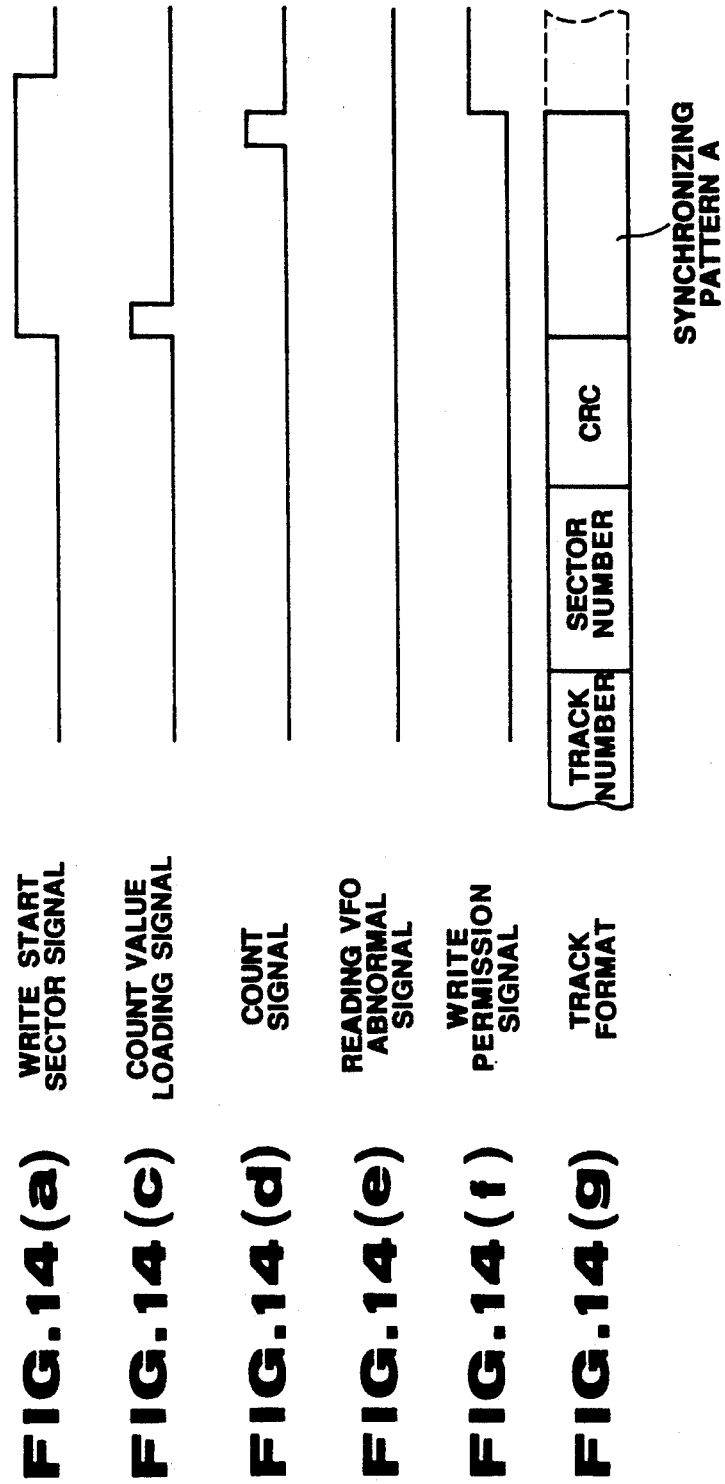

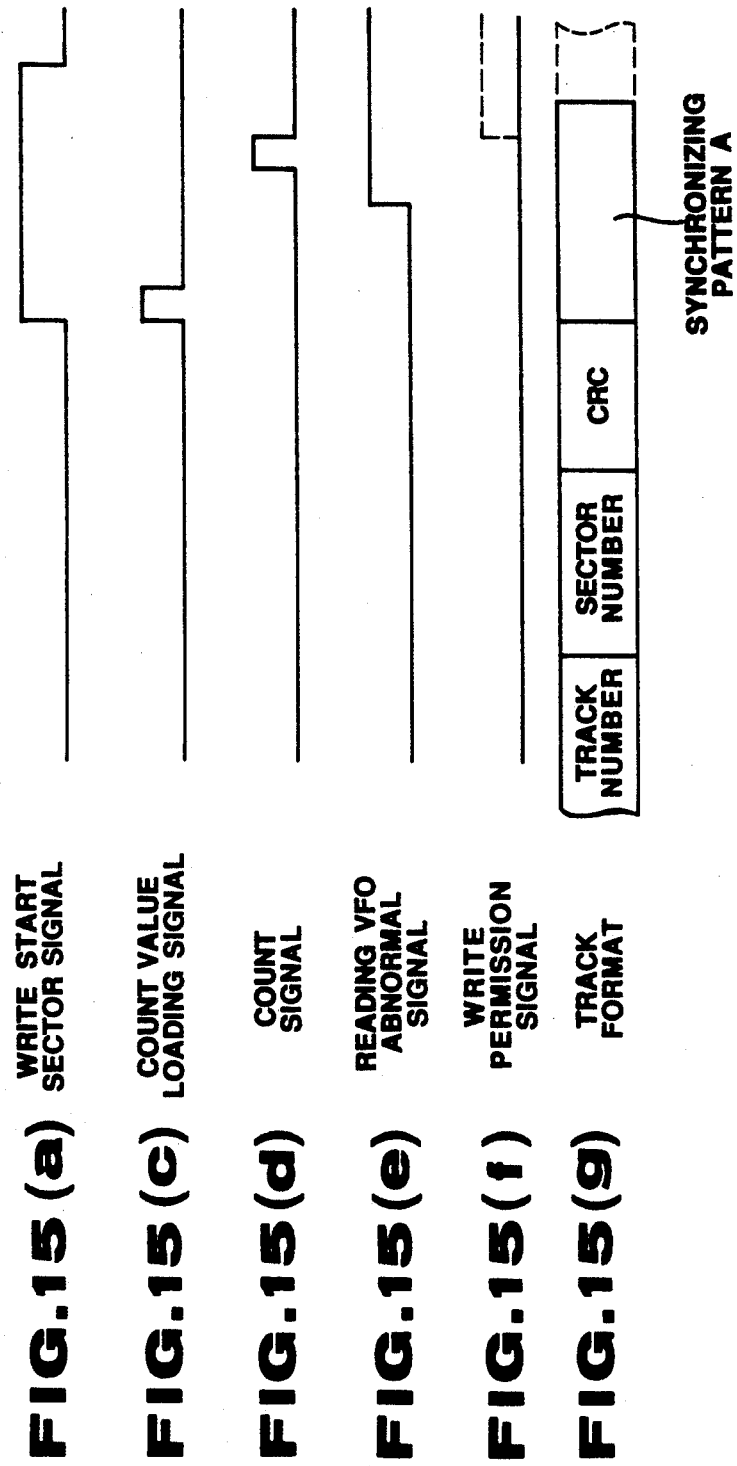

RELOADABLE OPTICAL RECORDING/REPRODUCING APPARATUS

BACKGROUND OF THE INVENTION

1. Field of the Invention

The present invention relates to a reloadable optical recording/reproducing apparatus, and, more particularly, to a reloadable optical recording/reproducing apparatus for reloading data continuously from data recorded at the preceding recording operation in accordance with the same modulating rule while eliminating a necessity of creating a gap and/or a preamble portion.

2. Description of the Related Art

Recently, optical cards of a type capable of registering an extremely large quantity of data in comparison with magnetic cards and IC cards have been developed. An optical recording/reproducing apparatus of the type for recording information by using the above-described optical card as the recording medium is arranged in such a manner that information is recorded by changing the reflectance of the medium by irradiating the optical card with laser beams the intensity of which has been modulated.

The optical card has, on the recording surface thereof, a plurality of elongated linear tracks each of which is sectioned into a plurality of sectors which respectively serve as recording units. The sector consists of a preformatted track number portion, a sector number portion, a CRC portion and a data portion on which data can be written. Furthermore, optical cards are usually provided with gaps each of which is formed between sectors in case there is a difference between the bit rate for writing and that for reading. Each of the sectors has, in its leading portion, a preamble portion and a synchronizing portion, while a synchronizing portion and a postamble portion are provided for the terminal portion of the same.

The optical cards structured as described above have been used to exclusively read information or to reload information. When information is reloaded, a gap of a predetermined size is formed continuously from the terminal portion of the sector onto which information has been previously recorded. Then, a preamble and a synchronizing pattern are written before data is written on the data portion. Subsequently, a synchronizing pattern and a postamble are written. However, this arrangement yields a relatively for formatting efficiency because of an excessively large redundancy due to the necessity of providing the gap, the preamble portion and the postamble portion whenever the reloading operation is performed.

Accordingly, a standardized format suggested by the OMCF (Optical Memory Card Forum) is sometimes employed. In accordance with the standardized format, the synchronizing portion is previously formatted continuously from the preamble portion, the synchronizing portion, the track number portion, the sector number portion and the CRC portion. When information is reloaded, synchronization is established by utilizing the synchronizing pattern of the synchronizing portion so as to sequentially write data continuously from the terminal portion of the preceding sector in accordance with the same modulating rule. Then, the track number, the sector number, the CRC and the synchronizing pattern for the ensuing reloading operation are written continuously from the above-described data items. Thus, the writing operation is completed. Then, the synchronizing pattern written at the preceding recording operation is utilized to establish the synchronization at the time of the reloading operation. As a result, data is continuously recorded onto a portion from the terminal portion of the sector, onto which data has been precedently recorded, in accordance with the same modulating rule as that employed at the time of the preceding recording operation.

In the conventional reloadable optical recording/reproducing apparatus of the type arranged in such a manner that information is reloaded onto an optical card onto which information has been recorded in accordance with the thus-arranged format, the portion onto which information has been recorded at the preceding recording operation is read out. Then, a read signal obtained by the above-described reading operation is binary-coded and demodulated before the terminal of the sector is detected from the demodulated data. In accordance with the detected terminal portion of the sector, the modulation of data to be reloaded is commenced. The modulated data is supplied to a laser diode drive circuit which subsequently changes the optical output from the laser diode in accordance with the modulated data so as to write data on the optical card at the same moment at which the terminal portion of the sector has been detected. Consequently, data is written in accordance with the same modulating rule continuously from the portion on which data has been precedently written.

However, in actual fact, a delay of the read signal with respect to the scanning operation performed by the optical head, a delay of the binary digital processing, a delay taken place at the time of the demodulation operation and a delay caused from the filtering processing are generated. As a result, data to be reloaded is delayed with respect to the terminal portion of the sector onto which data has been recorded at the preceding recording operation. In a case where the bit rate at the writing operation is not great, the quantity of the delay of the junction of the sectors is small enough to be followed as a small bit jitter. As a result, the reading operation cannot be substantially influenced. However, in a case where the bit rate is great, the bit interval at the junction of the sectors is enlarged excessively, causing a bit jitter, which cannot be compensated, to be generated. As a result, an undesirable bit deviation takes place. Consequently, for example, a clock bit and a data bit will be read while inverted. Therefore, a critical problem arises in that data cannot be read.

SUMMARY OF THE INVENTION

An object of the present invention is to provide a reloadable optical recording/reproducing apparatus arranged in such a manner that the phase of a writing VFO (Variable Frequency Oscillator) signal for writing data to be reloaded is compensated in accordance with the quantity of a circuit delay whereby the bit deviation can be prevented by continuing the junction of sectors and thereby data can be recorded with excellent format efficiency.

Another object of the present invention is to provide an optical recording/reproducing apparatus capable of recognizing the sector terminal portion while eliminating a necessity of detecting the final synchronizing pattern of the sector, on which data has been written at the preceding writing operation, so that the junctions of the sectors can be continued, thereby the bit deviation can be prevented and data can be recorded with excellent format efficiency.

According to one aspect of the present invention, there is provided a reloadable optical recording/reproducing apparatus for reloading data continuously from a recording area of a recording medium, onto which data has been recorded at the preceding recording operation, in accordance with the same modulating rule, the reloadable optical recording/reproducing apparatus comprising: a VFO circuit in which a reading VFO signal is obtained from a read signal obtained from the scanning of an optical card by an optical head; a demodulating circuit for demodulating the read signal and outputting demodulated data; sector terminal portion recognizing means for detecting the terminal portion of the recording area, onto which data has been recorded at the preceding recording operation, from the read signal and outputting a sector terminal recognizing signal; delay compensating means for proceeding the phase of the reading VFO signal at the timing defined in accordance with the sector terminal portion recognizing signal so as to output it as a writing VFO signal; and modulating means for modulating data to be reloaded in accordance with the writing VFO signal so as to drive the optical head.

Other and further objects, features and advantages of the invention will be appear more fully from the following description.

BRIEF DESCRIPTION OF THE DRAWINGS

FIGS. 2 to 6(a-d) respectively illustrate a first embodiment of a reloadable optical recording/reproducing apparatus according to the present invention, where FIG. 2 is a block diagram which illustrates the circuit structure;

FIG. 3 is a block diagram which illustrates the delay compensating circuit shown in FIG. 2;

FIGS. 4(a-c) to 6(a-d) respectively are timing charts which illustrate the operation of the delay compensating circuit;

FIGS. 7 and 8(a-c) illustrate a second embodiment of the reloadable optical recording/reproducing apparatus according to the present invention, where FIG. 7 is a block diagram which illustrates a sector terminal portion recognizing circuit according to the second embodiment of the present invention;

FIG. 8(a-c) illustrates the operation of the second embodiment of the present invention;

FIG. 9 is a block diagram which illustrates the circuit structure;

FIGS. 10(a-g) to 12(a-g) respectively are timing charts which illustrate the operation of the sector terminal portion recognizing means according to the third embodiment of the present invention;

FIGS. 13 to 15(a-g) respectively illustrate a fourth embodiment of the reloadable optical recording/reproducing apparatus according to the present invention, where FIG. 13 is a block diagram which illustrates the circuit structure; and FIGS. 14(a-g) and 15(a-g) respectively are timing charts which illustrate the operation of the sector terminal recognizing means according to the fourth embodiment of the present invention.

DESCRIPTION OF THE PREFERRED EMBODIMENT

Figure 1:
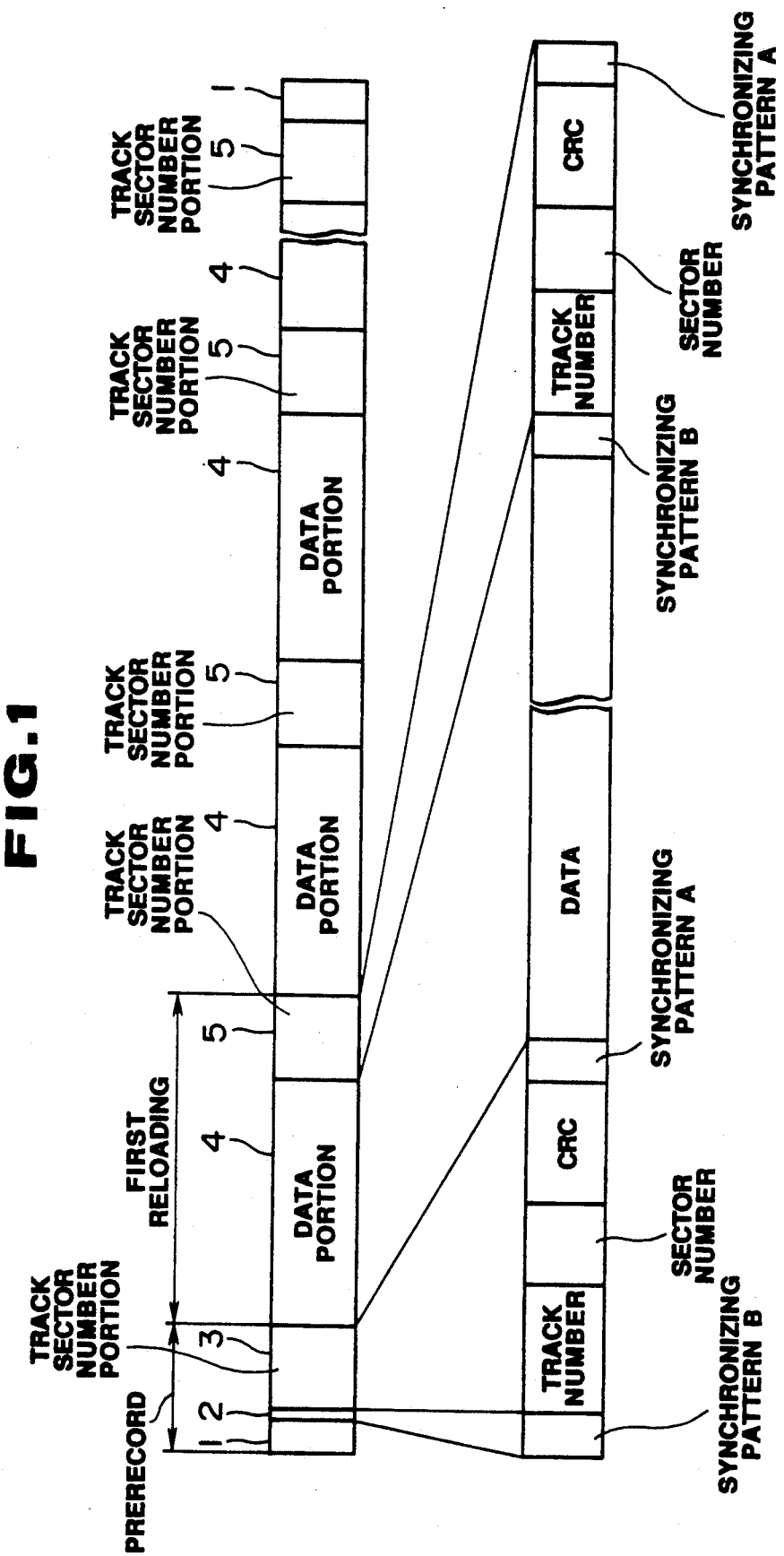
FIG. 1 illustrates a track format of an optical card.

As shown in FIG. 1, a track of an optical card according to this embodiment is composed of VFO (Variable Frequency Oscillator) incoming pattern portions 1, synchronizing portions 2, track number and sector number (address) portions 3 and 5 and data portions 4. The VFO incoming pattern portion 1 has VFO incoming patterns which are continuous patterns formed at the minimum pit intervals (for example, 1 T (T is a bit period) in the MFM modulation). The synchronizing portion 2 has a synchronizing pattern B for the track number. The track number and sector number portion 3 is arranged in such a manner that a synchronizing pattern A is formed next to the track number and the sector number to which a CRC is added. The synchronizing pattern A is a synchronizing pattern for data. The data portion 4 is composed of data and the synchronizing pattern B.

When the optical card thus constituted has not yet been used, only the VFO incoming pattern portions 1, the synchronizing portions 2 and the track number and sector number portions 3 have been prerecorded. When data for one sector is reloaded onto a portion next to the track number and sector number portion 3, the data portion 4 composed of data and the synchronizing pattern B is written in succession to the synchronizing pattern A. Furthermore, the track number and sector number portion 5 for the ensuing reloading operation is arranged to be written in succession to the data portion 4. Since the structure of the track number and sector number portion 5 is the same as that of the track number and sector number portion 3, the synchronizing pattern A is written on it at the time of the writing operation, thus the writing operation being completed. At the time of the reloading operation, the data portion 4 and the track number and sector number portion 5 are similarly written in the ensuing processes.

Figure 2:
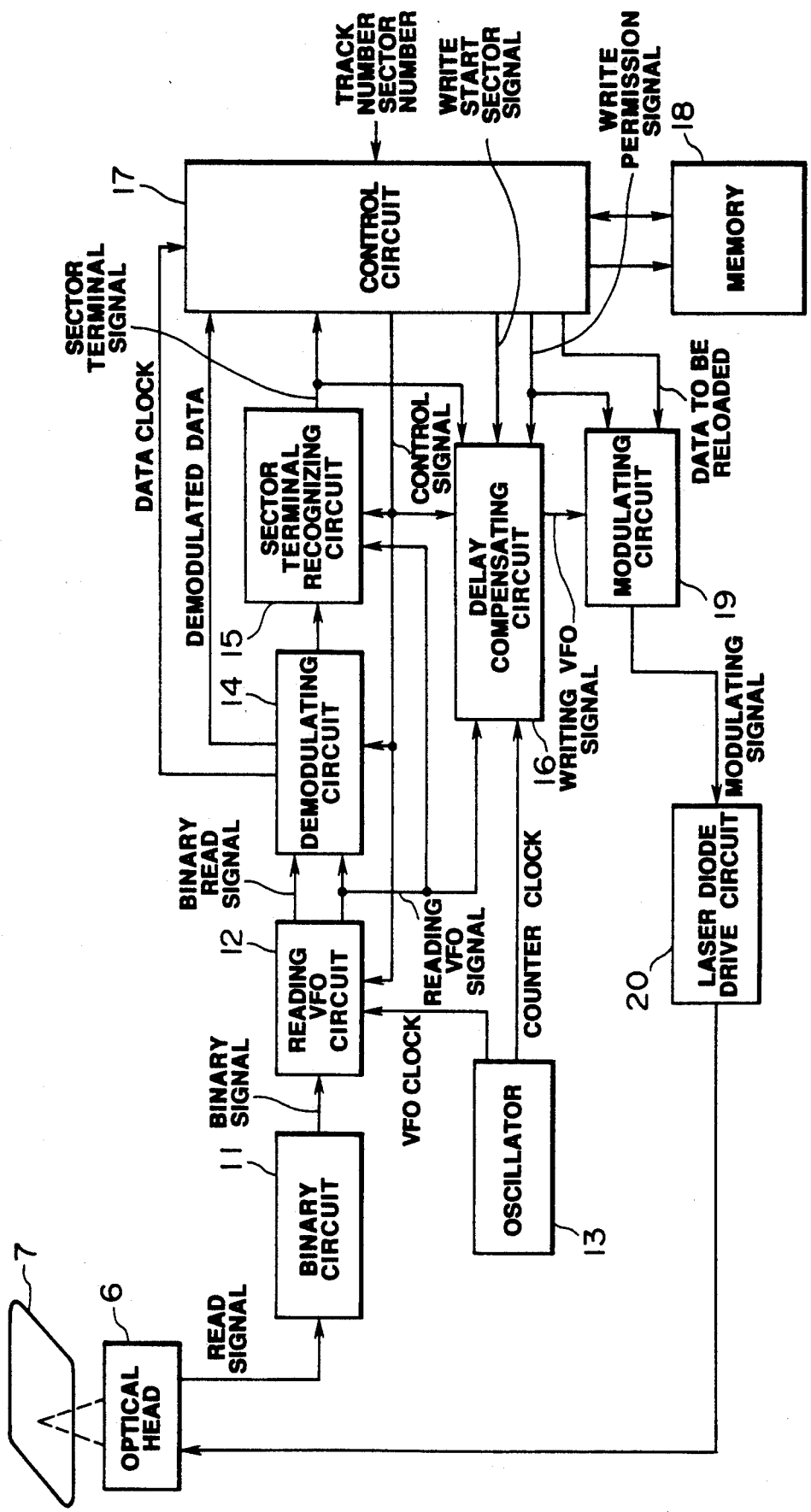

A reloadable optical recording/reproducing apparatus according to a first embodiment of the present invention is constituted as shown in FIG. 2. As shown in FIG. 2, a read signal obtainable when an optical head 6 scans the pit pattern formed in an optical card 7 is supplied to a binary circuit 11. The level change in the read signal due to the difference in the reflectance between the pit portion of the optical card and the other portions causes the binary circuit 11 to obtain a pulse binary signal at the edge of the pit. The binary signal thus-obtained is supplied to a VFO circuit 12 for reading data. The VFO circuit, to which a VFO clock has been supplied from an oscillator 13, generates a reading VFO signal from the binary signal by utilizing the VFO clock, the reading VFO signal being used to read data. The reading VFO signal is output to a demodulating circuit 14, a sector terminal portion recognizing circuit 15, which serves as sector terminal portion recognizing means, and a delay compensating circuit 16 which serves as delay compensating means. The VFO circuit 12 further outputs a binary read signal which includes a clock and which has been synchronized. The oscillator 13 further generates a counter clock obtained by multiplying the VFO clock in units of 100.

The synchronized binary read signal and the reading VFO signal are supplied to the demodulating circuit 14. The demodulating circuit 14 utilizes the reading VFO signal so as to demodulate the read signal. In this case, the demodulating circuit 14 supplies demodulated data which includes a clock to the sector terminal portion recognizing circuit 15 in which a data clock and the demodulated data are separated from each other so as to be supplied to a control circuit 17.

The sector terminal recognizing circuit 15 has a shift register (omitted from illustration) for latching the demodulated data which includes the clock. The sector terminal recognizing circuit 15 detects the coincidence of the output pattern from the shift register with the synchronizing pattern A. Since the preceding recording operation has been, as described above, completed at the synchronizing pattern A, the sector terminal recognizing circuit 15 recognizes the terminal portion (the terminal portion of the sector) of the recording area onto which data has been recorded at the preceding recording operation when it detects the synchronizing pattern A. Thus, the sector terminal recognizing circuit 15 outputs, as the sector terminal recognizing signal, a pulse sector terminal signal to the control circuit 17 and the delay compensating circuit 16.

The control circuit 17 controls the reading VFO circuit 12, the demodulating circuit 17, the sector terminal recognizing circuit 15 and the delay compensating circuit 16 by supplying control signals to them. Furthermore, the track number and the sector number of data to be reloaded are supplied to the control circuit 17. The control circuit 17 causes the data thus supplied to be stored in a memory 18 so as to be subjected to comparisons with the track number and with the sector number denoted by the demodulated data. That is, the control circuit 17 has a shift register (omitted from illustration) which latches the demodulated data at the timing of the data clock. The control circuit 17 checks the CRC in accordance with the output from the shift register. If the result of the check is right, it further determines whether or not the track number and the sector number denoted by the output from the shift register coincide with those stored in the memory 18. If they respectively coincide with each other, the control circuit 17 generates a write start sector signal in the period of the synchronizing pattern A so as to output it to the delay compensating circuit 16. The control circuit 17 outputs, as a signal denoting the permission of writing, a write permission signal to the delay compensating circuit 16 and the modulating circuit 19 from the moment at which both the write start sector signal and the sector terminal signal have been respectively raised to a high level (hereinafter called "H") to the moment at which writing is completed, the write permission signal being "H".

Figure 3:
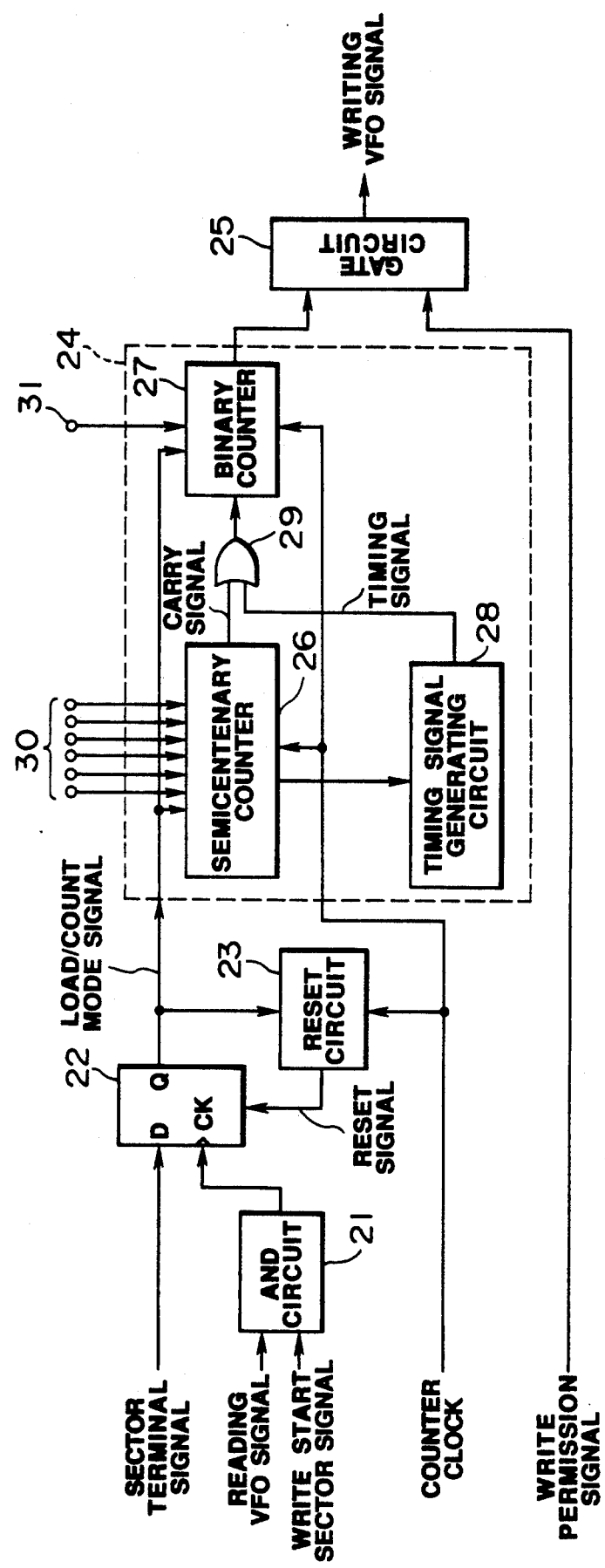

As shown in FIG. 3, the delay compensating circuit 16 comprises an AND circuit 21, a latch circuit 22, a reset circuit 23, a centenary counter 24 and a gate circuit 25. The AND circuit 21 is given a reading VFO signal and a write start sector signal. The AND circuit 21 supplies the reading VFO signal to a clock terminal CK of the latch circuit 22 in a period in which the write start sector signal is "H". The sector terminal signal is supplied to a data terminal D of the latch circuit 22 so that the latch circuit 22 latches the sector terminal signal supplied to the data terminal D at the last transition of a clock supplied to the clock terminal CK. The latch circuit 22 supplies the signal thus latched to the centenary counter 24 as a load/count mode signal. That is, at the moment (at the leading end of the synchronizing pattern A) at which the write start signal has been changed from a low level (hereinafter called "L") to "H", the sector terminal signal is "L". Therefore, a count mode signal of "L" is supplied from the lath circuit 22 to the counter 24. When the sector terminal signal has been changed to "H" at the terminal of the synchronizing pattern A, the latch circuit 22 outputs a load mode signal to the counter 24 at the last transition timing of the reading VFO signal. The timing at which the above-described load mode signal is output is called "load timing" hereinafter.

The centenary counter 24 comprises a semicentenary counter 26 and a binary counter 27. Clock pulses are supplied to the semicentenary counter 26 from an oscillator 13 so as to be counted by the centenary counter 26. The output from the centenary counter 26 denoting the result of counting is supplied to a timing signal generating circuit 28 and the same is also supplied to the binary counter 27 via an OR circuit 29 as a carry signal. The timing signal generating circuit 28 is arranged in such a manner that it outputs a timing signal to the binary counter 27 via the OR circuit 29 at the moment at which the semicentenary counter 26 has counted a plurality of the clock pulses starting from the load timing in a case where the quantity of the circuit delay at the junction between sectors is in a range from 0.25 T to 0.5 T. The binary counter 27 counts the outputs from the OR circuit 29 so as to invert the output at the timing of the carry signal output from the semicentenary counter 26 or the timing signal output from the timing signal generating circuit 28.

The semicentenary counter 26 loads preset value DINA to DINF supplied from a preset input terminal 30 when a load mode has been instructed in response to the load mode signal supplied. The binary counter 27 loads the preset value DING supplied through a preset input terminal 31 at the load timing when the load mode has been instructed. The output from the above-described latch circuit 22 is also supplied to the reset circuit 23. The reset circuit 23 is also given the clock pulses so as to output a reset signal for resetting the output from the latch circuit 22 at the last transition of the clock pulses after the load mode signal has been supplied, the reset signal being output to the latch circuit 22. As a result, the output from the latch circuit 22 serves as the count mode signal which subsequently causes the counters 26 and 27 to start counting from the preset value. The preset values DINA and DING are established by the control circuit 17 in accordance with the quantity of the circuit delay from the moment at which the demodulated data is obtained from the read signal to the moment at which writing is performed after the sector terminal signal has been generated.

The output from the binary counter 27 is, as a writing VFO signal, output via the gate circuit 25. The gate circuit 25 has received a write permission signal from the control circuit 17 so as to output the writing VFO signal to the modulating circuit 19 only in the period in which the write permission signal is being supplied.

As shown in FIG. 2, the modulating circuit 19 is also given data to be reloaded from the control circuit 17 so that the modulating circuit 19 modulates the data to be reloaded in accordance with the same modulating rule as that used at the preceding recording operation. The modulating circuit 19 then outputs a signal denoting the modulated data to a laser diode drive circuit 20 in the period in which the write permission signal is being supplied. The laser diode drive circuit 20 drives a laser in response to the modulated signal so that the optical card 7 is irradiated with laser beams emitted from the optical head 6. The above-described modulating circuit 19 and the laser diode drive circuit 20 constitute modulating means.

Then, the operation of the reloadable optical recording/reproducing apparatus thus-constituted will now be described with reference to FIGS. 4 to 6. FIG. 4 (a) illustrates a write start sector signal, FIG. 4 (b) illustrates the sector terminal signal and FIG. 4 (c) illustrates a track format. FIG. 5 illustrates a portion in the vicinity of the terminal of the synchronizing pattern A, where FIG. 5 (a) illustrates the write start sector signal, FIG. 5 (b) illustrates the synchronizing pattern A, FIG. 5 (c) illustrates the reading VFO signal, FIG. 5 (d) illustrates the sector terminal signal, FIGS. 5 (e) and 5 (F) respectively illustrate the writing VFO signal. FIG. 6 illustrates an enlarged view of the time base in the portion defined by the dashed line. FIG. 6 (a) illustrates the reading VFO signal, FIG. 6 (b) illustrates the sector terminal signal, FIG. 6 (c) illustrates the load/count mode signal and FIG. 6 (d) illustrates the counter clock.

When data is reloaded, the assigned track number and the sector number, to which data to be reloaded, are informed to the control circuit 17. The optical head 6 then commences the reading operation. A signal denoting the result of the reading operation is then binary-coded in the binary circuit 11. The reading VFO circuit 12 generates the reading VFO signal in accordance with the binary signal supplied from the binary circuit 11 and as well as generates a binary read signal which has been synchronized. The demodulating circuit 14 demodulates the synchronizing binary read signal by utilizing the reading VFO signal. The demodulated data and the data clock output from the demodulating circuit 14 are separated from each other before they are supplied to the control circuit 17. The demodulated data including the clock is supplied to the sector terminal recognizing circuit 15.

The control circuit 17 detects the track number and the sector number used in the preceding recording operation from the demodulated data. That is, the control circuit 17 latches the demodulated data at the timing of the data clock so that the CRC check is performed in which it is determined whether or not the assigned track number and the sector number coincide with the track number and the sector number denoted by the demodulated data. If they respectively coincide with each other, the write start sector signal of "H" is output at the start timing of the synchronizing pattern A as shown in FIGS. 4 (a) and 4 (c).

On the other hand, the sector terminal recognizing circuit 15, at the timing of the reading VFO signal, latches the demodulated data including the clock so that a fact that the same pattern as the synchronizing pattern A has been demodulated is detected. As a result, the sector terminal signal is generated at the terminal of the synchronizing pattern A as shown in FIG. 4 (b). The sector terminal signal and the write start sector signal are supplied to the delay compensating circuit 16.

The AND circuit 21 of the delay compensating circuit 16 supplies the reading VFO signals, which have been obtained in the period in which the write start signal is "H", to the clock terminal CK of the latch circuit 22. The latch circuit 22 latches the sector terminal signal at the timing of the signal to be supplied to the clock terminal CK so as to output it as the load/count mode signal to the centenary counter 24. As shown in FIGS. 5 (b), 5 (c) and 5 (d), the sector terminal signals are generated at the first transition timing of the reading VFO signals for detecting the bit of the terminal of the synchronizing pattern A. At the last transition timing of the above-described reading VFO signals, the load mode signals are supplied to the centenary counter 24.

When the load mode is selected, the centenary counter 24 loads the preset value supplied to the preset input terminals 30 and 31 at the load timing. As shown in FIG. 6, the load mode signal supplied from the latch circuit 22 is changed to the count mode signal of "L" in response to the reset signal output from the reset circuit 23, the load mode signal being changed at the last transition edge of the counter clock after the load signal has been generated. Thus, the centenary counter 24 commences counting from the preset value at the load timing. For example, in a case where the preset value is 20, the semicentenary counter 26 generates a carry signal whenever it counts 30 counter clocks from the load timing. The carry signal is supplied to the binary counter 27 via the OR circuit 29 so that the output from the binary counter 27 is inverted. The output from the binary counter 27 is output as the writing VFO signal via the gate circuit 25. That is, the phase of the writing VFO signal can be allowed to advance by 0.1 T with respect to that of the reading VFO signal by making the preset value to be 20.

An assumption is made that the quantity of the circuit delay is 0.25 T or less. In this case, the timing signal is not output from the timing signal generating circuit 28. Therefore, the carry signal is, as shown in FIG. 5 (e), output from the semicentenary counter 26 after a time, which is defined in accordance with the preset value, has passed from the load timing so that the output from the binary counter 27 is inverted. Subsequently, the outputs from the binary 27 are inverted whenever 50 counter clock pulses are counted, that is, each 0.25 T.

On the other hand, in a case where the quantity of the circuit delay is in a range from 0.25 to 0.5 T, the timing signal is generated by the timing signal generating circuit 28 after a plurality of counts have been made from the load timing. The timing signal thus generated is supplied to the binary counter 27 via the OR circuit 29 so that the output from the binary counter 27 is inverted substantially immediately after the load timing as shown in FIG. 5 (f). Subsequently, the carry signal is generated after a time, which is defined in accordance with the preset value, has passed so that the output from the binary counter 27 is again inverted. Thus, the writing VFO signal, the phase of which is allowed to lead the reading VFO signal by 0.25 to 0.5 T, can be generated.

The writing VFO signal, the phase of which has been adjusted in accordance with the preset value, is supplied to the modulating circuit 19. Since data to be written has been supplied to the modulating circuit 19 from the control circuit 17, it processes the modulated signal by utilizing the writing VFO signal so as to supply it to the laser diode drive circuit 20. The laser diode drive circuit 20 writes data to be written by driving the laser diode in response to the modulated signal.

As described above, according to this embodiment, the centenary counter 24 counts the counter clock which is the multiplication of the reading VFO signal in units of 100 so that the writing VFO signal is generated. Therefore, the value according to the circuit delay is loaded onto the centenary counter at the timing of the reading VFO signal at the terminal of the preceding recording operation. Therefore, the phase of the writing VFO signal can be allowed to lead that of the reading VFO signal by a quantity which corresponds to the circuit delay. Consequently, the bit deviation at the junction between sectors can be prevented. As a result, the problem of discontinuous junctions between sectors can be prevented at the time of the reading operation. Therefore, data can be assuredly read out.

FIGS. 7 and 8 illustrate a second embodiment of the reloadable optical recording/reproducing apparatus according to the present invention. FIG. 7 is a block diagram which illustrates the sector terminal recognizing circuit according to the second embodiment of the present invention. FIG. 8 illustrates the operation of the apparatus according to the second embodiment. FIG. 8 (a) illustrates the sector terminal signal according to the first embodiment of the present invention, while FIG. 8 (b) illustrates the sector terminal signal according to the second embodiment of the present invention. FIG. 8 (c) illustrates the synchronizing pattern A.

According to this embodiment, even if the quantity of the circuit delay at the junctions between the sectors is larger than 0.5 T, it can be compensated. The apparatus according to this embodiment is constituted similarly to that according to the first embodiment except for the arrangement in which the sector terminal recognizing circuit 35 shown in FIG. 7 is employed in place of the sector terminal recognizing circuit 15 shown in FIG. 2.

The sector terminal recognizing circuit 35 comprises synchronizing pattern detecting circuits 36, 37 and a selection circuit 38. The synchronizing pattern detecting circuit 36 has the same structure as that of the sector terminal recognizing circuit 15 shown in FIG. 2. The synchronizing pattern detecting circuit 36 outputs a detection signal to the selection circuit 38 in a case where the same pattern as all of the bits (n bits) of the synchronizing pattern A has been obtained from the demodulated data. On the other hand, the synchronizing pattern detecting circuit 37 outputs a detection signal to the selection circuit 38 in a case where the same pattern of m bits except for (n - m) bits at the terminal portion of the synchronizing pattern A has been obtained from the demodulated data. The selection circuit 38 selects the detection signal output from the synchronizing pattern detecting circuit 37 in the period in which the write start signal is "H". In a case where the reading mode is selected, the detection signal output from the synchronizing pattern detecting circuit 36 is selected so as to output it as the sector terminal signal. In the periods except for the period in which the write start sector signal is "H", the synchronizing pattern detecting circuit 36 detects the coincidence of all of the patterns so that the erroneous operation at the time of the reading operation is prevented.

According to this embodiment thus-constituted, the synchronizing pattern detecting circuit 37 outputs the detection signal if the leading m bits of the demodulated data in its synchronizing portion coincide with the m bits of the synchronizing pattern A. If the value of (n - m) is a small value, a fear of erroneously detecting the synchronizing pattern A can be satisfactorily eliminated in a case where the coincidence detection of m bits is performed. As a result, the detection signal is output from the synchronizing pattern detecting circuit 37 at the timing of the leading m bits so that the sector terminal signal is output from the selection circuit 38. As a result, the sector terminal signal is generated at the timing which is faster than the terminal of the sector by (n - m) bits as shown in FIGS. 8 (b) and 8 (c). The above-described sector terminal signal is supplied to the delay compensating circuit 16 so that the writing VFO signal is generated. That is, the phase of the writing VFO signal is allowed to proceed in accordance with the preset value to be given to the preset input terminals 30 and 31 and the bit detected by the synchronizing pattern detecting circuit 37.

As described above, according to this embodiment, the circuit delay of an interval of 0.5 T to (n - m) bit pattern can be compensated. For example, letting (n - m) be 2, the circuit delay in a range from 0.5 to 1 T can be compensated.

The other operations and the effects are the same as those obtainable from the first embodiment.

Figure 9:
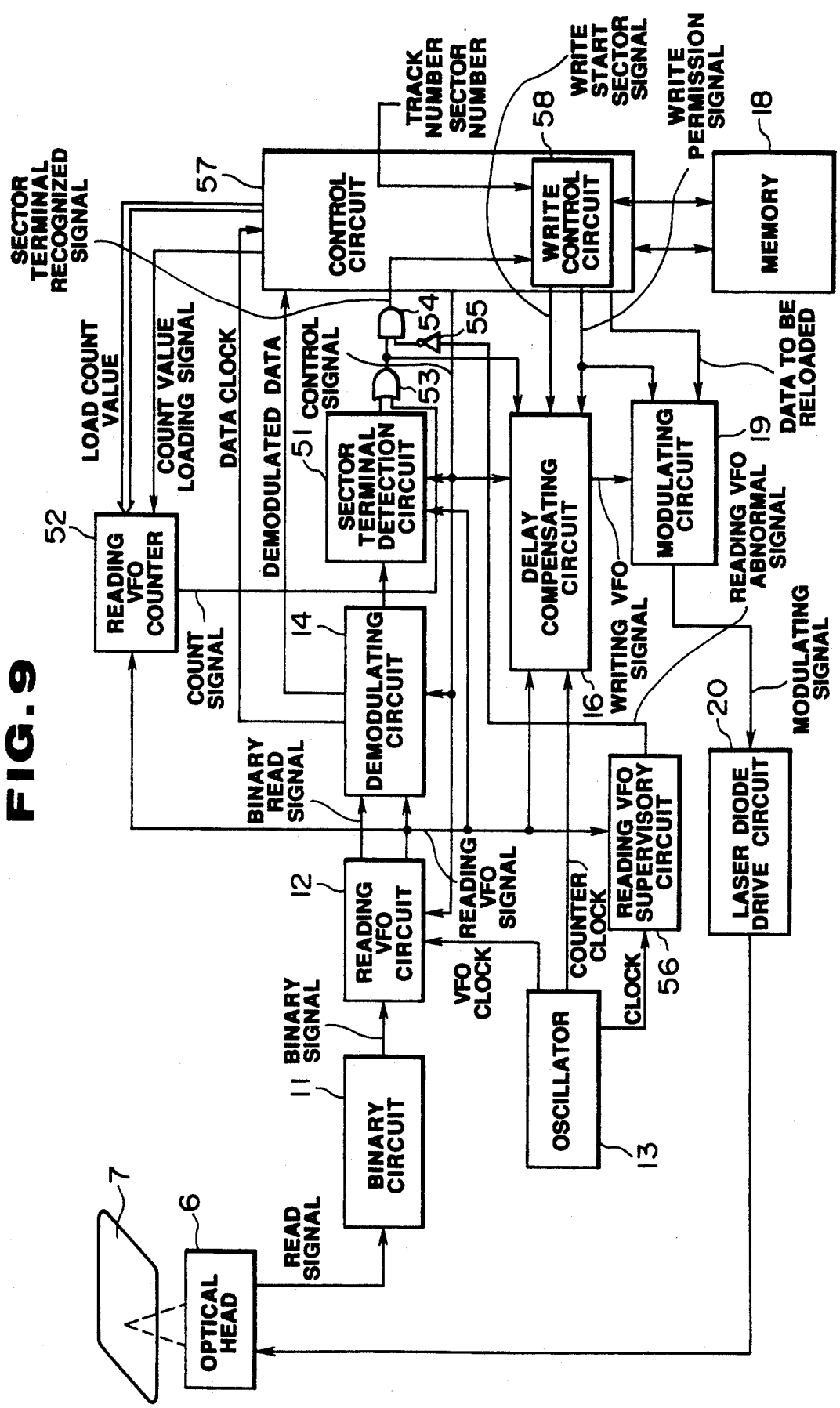
FIGS. 9 to 12(a-g) respectively illustrate a third embodiment of the reloadable optical recording/reproducing apparatus according to the present invention, where
Figure 10:
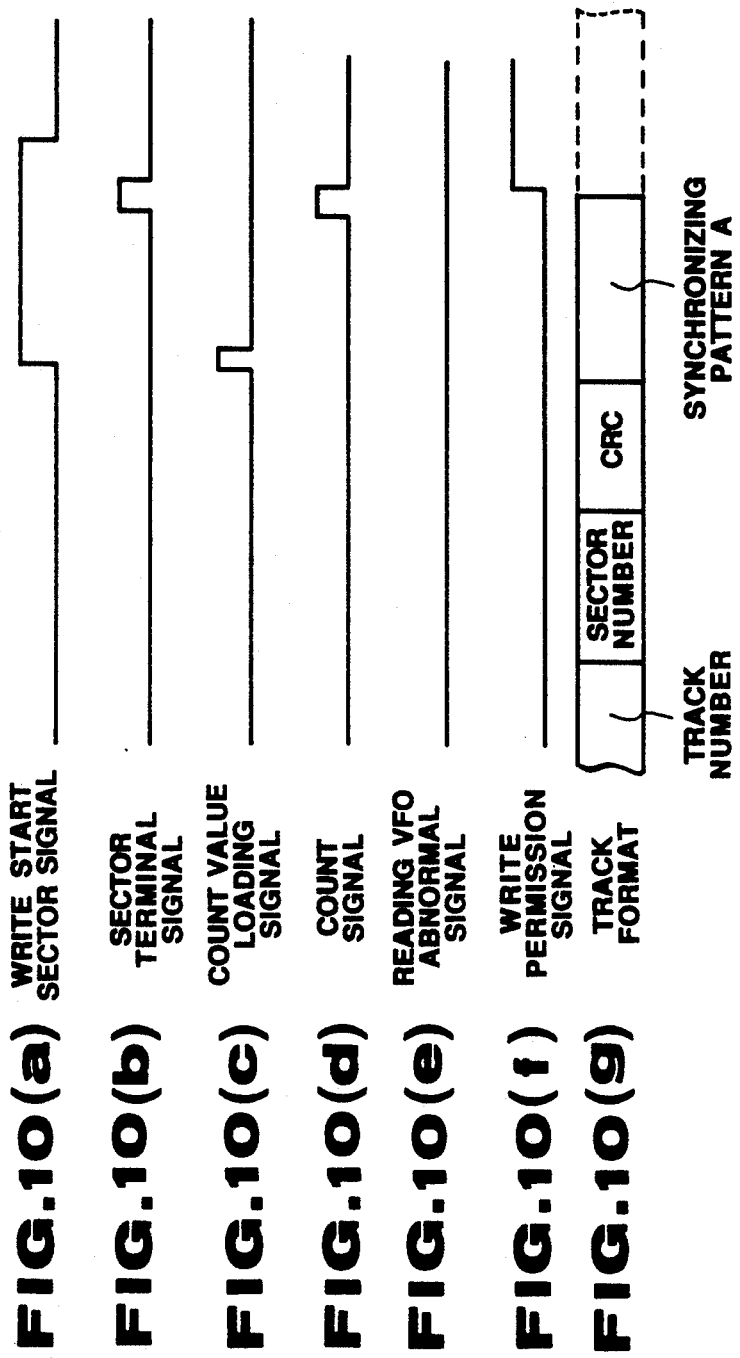
Figure 11:
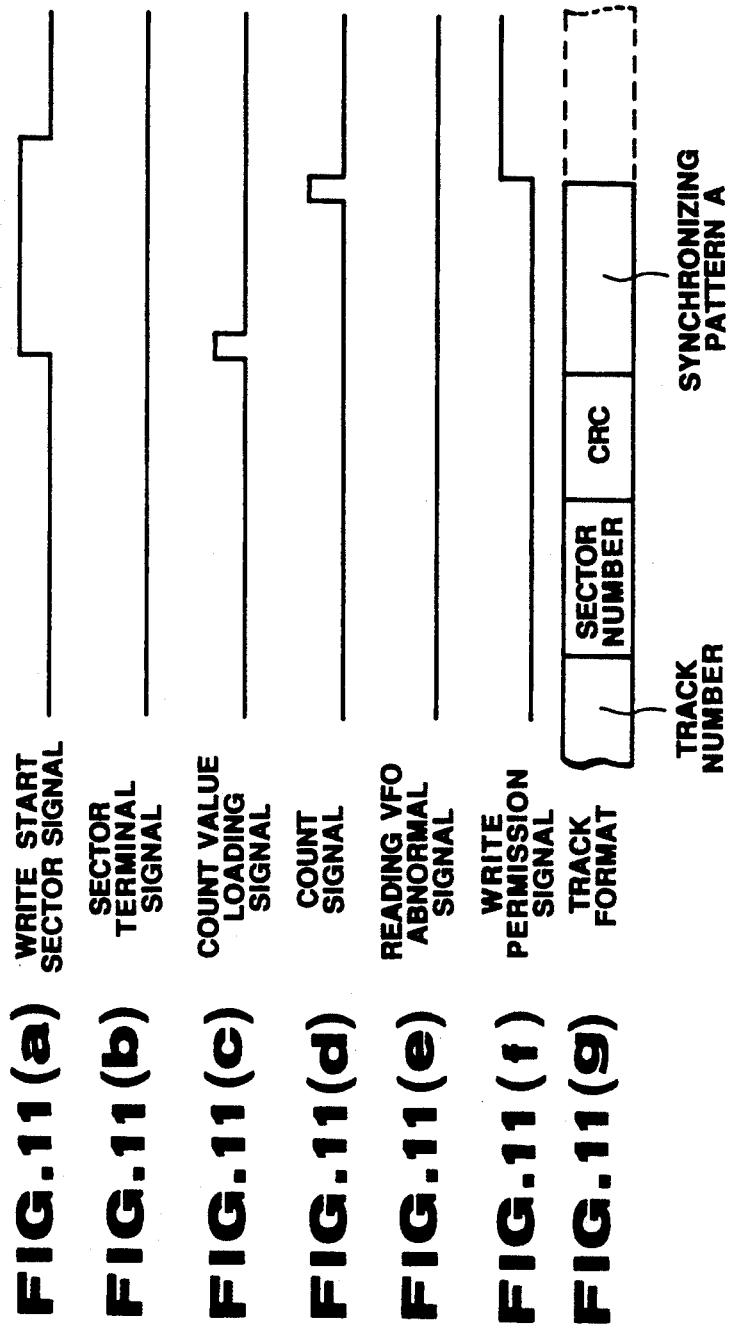
Figure 12:
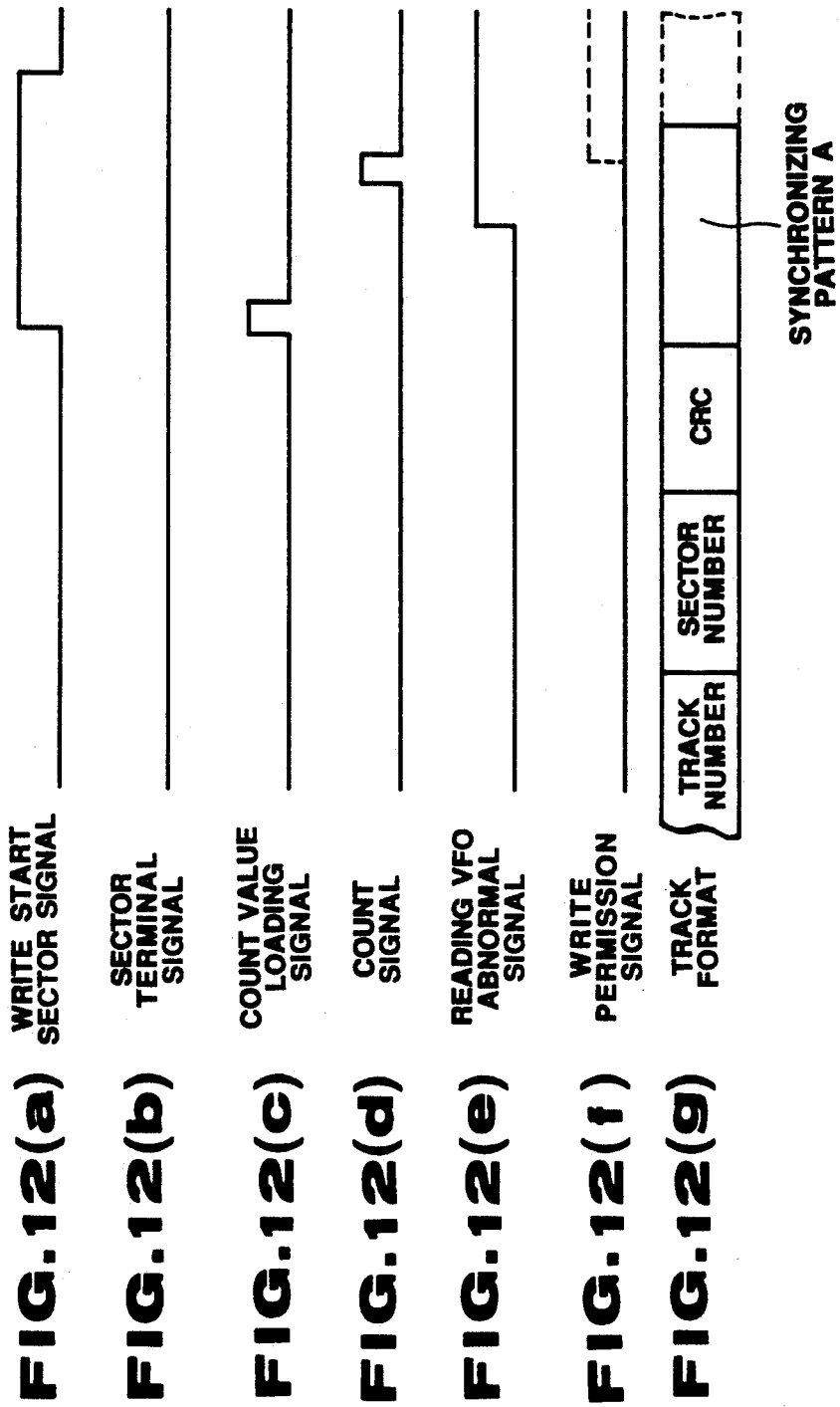

FIGS. 9 to 12 illustrate a third embodiment of the present invention. FIG. 9 is a block diagram which illustrates the circuit structure of the optical recording-/reproducing apparatus. FIGS. 10 to 12 respectively are timing charts for the operation of the sector terminal portion recognizing means.

As shown in FIG. 9, the read signal obtained when the optical head 6 scans the pit pattern of the optical card 7 is supplied to the binary circuit 11. The binary circuit 11 generates a pulse binary signal in accordance with the change in the level of the read signal due to the difference in the reflectance between the pit formed portion of the optical card and the other portions. The binary signal thus generated is then supplied to the reading VFO circuit 12.

The VFO clock pulses have been supplied to the above-described VFO circuit 12 from the oscillator 13, the VFO circuit 12 utilizing the VFO clock pulses to generate the reading VFO signal from the binary signal. Then, the reading VFO signals are supplied to the demodulating circuit 14, the sector terminal detecting circuit 51, the delay compensating circuit 16 and the reading VFO counter 52 which serves as the reading VFO counting means. The VFO circuit 12 as well outputs the binary read signal which includes the clock and which has been synchronized. The above-described oscillator 13 also generates the counter clock which is formed by dividing the VFO clock pulse by 100.

The synchronized binary read signal and the reading VFO signal are supplied to the demodulating circuit 14. By utilizing the thus supplied reading VFO signal, the read signal is demodulated by the demodulating circuit 14. In this case, the demodulating circuit 14 outputs the demodulated data including the clock to the sector terminal detecting circuit 51 so as to separate the data clock and the demodulated data from each other before they are supplied to a control circuit 57.

The sector terminal detecting circuit 51 is arranged similarly to the sector terminal recognizing circuit 15 according to the first embodiment of the present invention, the sector terminal detecting circuit 51 having a shift register (omitted from illustration). The above-described shift register latches the demodulated data, which includes the clock, in response to the reading VFO signal. Thus, the sector terminal detecting circuit 51 detects the coincidence of the output pattern from the above-described shift register with the synchronizing pattern A. As a result, the terminal portion of the recording area onto which data has been recorded at the preceding recording operation is detected so that a sector terminal signal in the form of a pulse is supplied to one of the input terminals of the OR circuit 53.

The reading VFO counter 52 is a down-counter which acts to use the reading VFO signal as its clock, the reading VFO counter 52 being arranged to receive the load count value and the count value loading signal from the control circuit 57. The above-described load count value is set to correspond to the number of the VFO signals for the synchronizing pattern A. The above-described reading VFO counter 52 supplies the pulse count signal to the above-described OR circuit 53 at the moment at which the counter has been made to be zero. The OR circuit 53 calculates the logical sum of the above-described sector terminal signal and the count signal. The output denoting the logical sum is supplied to one of the input terminals of the AND circuit 54 and the delay compensating circuit 16.

The clock of a predetermined frequency output from the oscillator 13 and the above-described reading VFO signal are supplied to a reading VFO supervising circuit 56 which serves as reading VFO supervising means. The reading VFO supervising circuit 56 supervises the reading VFO signal by utilizing the above-described clock pulses of a predetermined frequency. If the frequency of the reading VFO signal is not included in a predetermined allowable range, the reading VFO supervising circuit 56 outputs a reading VFO abnormal signal to an NOT circuit 55. The output from the NOT circuit 55 is supplied to another output terminal of the AND circuit 54. The AND circuit 54 calculates the logical sum of the inversion of the above-described reading VFO abnormal signal and the output from the OR circuit 53. The output denoting these operation is, as the sector terminal recognizing signal, supplied to the control circuit 57. The above-described sector terminal detecting circuit 51, the reading VFO counter 52, the OR circuit 53, the AND circuit 54, the NOT circuit 55 and the leading VFO supervising circuit 56 constitute sector terminal recognizing means.

The control circuit 57 performs the control operation by supplying control signals to the reading VFO circuit 12, the demodulating circuit 14, the sector terminal detecting circuit 51 and the delay compensating circuit 16. The control circuit 57 includes a write control circuit 58, which serves as write control means, so as to permit data writing.

The above-described control circuit 57 receives data about the track number and the sector number onto which data is reloaded. The control circuit 57 stores the data in the memory 18 so that the data thus stored is compared with the track number and the sector number denoted by the demodulated data. The control circuit 57 includes a shift register (omitted from illustration) which latches the demodulated data at the timing of the data clock. The output from the shift register is used to check the CRC. If the CRC is right, a determination is made whether or not the track number and the sector number denoted by the output from the shift register and the track number and the sector number stored in the memory 18 respectively coincide with each other. If they respectively coincide with each other, the control circuit 57 generates the write start sector signal in a period of the synchronizing pattern A so as to output it to the delay compensating circuit 16. The write control circuit 58 outputs the write permission signal of "H" as a signal denoting that data writing is permitted to the delay compensating circuit 16 and the modulating circuit 19 in a period from a moment at which both the output from the write start sector signal and that of the AND circuit 54 have been raised to "H" to a moment at which the writing operation is completed.

The delay compensating circuit 16 compensates the delay of the write VFO signal at the time of the writing operation, the delay compensating circuit 16 being arranged similarly to that according to the first embodiment. The delay compensating circuit 16 outputs the writing VFO signal to the modulating circuit 19 only in the period in which the above-described write permission signal is generated.

As shown in FIG. 9, data to be reloaded is supplied to the modulating circuit 19 from the control circuit 57. The modulating circuit 19 utilizes the above-described writing VFO signal to modulate the data to be reloaded in accordance with the same modulating rule employed in the preceding recording operations. Thus, the modulating circuit 19 outputs the modulated signal to the laser diode drive circuit 20 in the period in which the write permission signal is generated. The laser diode drive circuit 20 drives the laser in response to the modulated signal to irradiate the optical card 7 with laser beams emitted from the optical head 6.

Then, the operation of the optical recording/reproducing apparatus according to this embodiment will now be described.

The first and second embodiments of the present invention are arranged in such a manner that the final synchronizing pattern of the sector on which data has been written at the preceding writing operation is detected and the sector terminal portion is thereby recognized whereby data is written by compensating the phase of the writing VFO signal. However, dust and damage will sometimes cause a problem in that the above-described synchronizing pattern cannot be detected. In this case, there is a necessity of repeating the writing operation until the synchronizing pattern is detected. Furthermore, if the synchronizing pattern cannot be detected even if the writing operation is repeated, data cannot be written on the sectors ensuing the subject track, causing a problem to be arisen in that the recording efficiency to be deteriorated.

Accordingly, this embodiment is arranged in such a manner that the reading VFO counter 52 is provided as shown in FIG. 9 so as to count the reading VFO in a case where the synchronizing pattern A has not been normally detected, the count signal thus generated being used to recognize the sector terminal portion so that the sector terminal recognizing signal is output.

When data is reloaded, the assigned track number and the sector number to which data to be reloaded is written are first informed to the control circuit 57. Then, the optical head 6 commences the reading operation. The read signal denoting the read out information is binary-coded in the binary circuit 11. The reading VFO circuit 12 generates the reading VFO signal in response to the binary signal supplied from the binary circuit 11. The reading VFO circuit 12 also generates the binary read signal which has been synchronized. The demodulating circuit 14 utilizes the reading VFO signal so as to demodulate the synchronized binary read signal. The demodulated data and the data clock supplied from the demodulating circuit 14 are separated from each other so as to be received by the control circuit 57. The demodulated data including the clock is supplied to the sector terminal detecting circuit 51.

The control circuit 57 detects the track number and the sector number portions at the preceding recording operation from the above-described demodulated data. That is, the control circuit 57 latches the demodulated data at the timing of the data clock so that the CRC check is performed in which whether or not the assigned track number and the sector number and the track number and the sector number denoted by the demodulated data respectively coincide with each other. If they respectively coincide with each other, a write start sector signal (a) of "H" is, as shown in FIG. 10, output at the starting timing of the synchronizing pattern A of a track format (g). At this time, the load count value and the count value loading signal (c) are output to the reading VFO counter 52.

The sector terminal detecting circuit 51 latches the demodulated data including the clock at the timing of the reading VFO signal so as to detect the fact that the same pattern as the synchronizing pattern A has been demodulated. As a result, the sector terminal detecting circuit 51 generates a sector terminal signal (B) at the terminal of the synchronizing pattern A.

On the other hand, the reading VFO counter 52 counts down the value which corresponds to the period of the synchronizing pattern A, the reading VFO counter 52 using the reading VFO signal as the clock. When the count has been made to be zero, the reading VFO counter 52 generates a count signal (d). In this state, the frequency of the above-described reading VFO is supervised by the reading VFO supervising circuit 56 whereby a reading VFO abnormal signal (e) is output when the frequency is not included in a predetermined allowable range. As a result, the problem can be prevented which takes place in such a manner that the frequency of the reading VFO is changed due to the presence of dust or damage, the above-described count signal is not output at a position which is not the predetermined position and the data is thereby erroneously written. In this case, since an assumption is made that the reading VFO is normal, the reading VFO abnormal signal (e) is maintained at "L".

The above-described sector terminal signal and the count signal are subjected to a calculation for obtaining the logical sum performed by the OR circuit 53. The output denoting the logical sum is output to the delay compensating circuit 16 and, as the sector terminal recognizing signal, to the write control circuit 58, which is provided in the control circuit 57, via the AND circuit 54. The above-described write start signal serves as a window signal which denotes the track number and the sector number on which the data is written and with which writing is performed by recognizing the terminal of the sector in response to the sector terminal signal or the count signal. The write start signal is counted by, for example, a counter so as to secure the margin of the window before it is lowered to "L" in the leading portion of the next data portion.

When the above-described sector terminal signal or the count signal has been output in the period in which the write start sector signal is "H" and the sector terminal is thereby recognized, the write permission signal (f), which permits the data writing at the timing of the sector terminal by the write control circuit 58, is raised to "H" so that data is written.

If the synchronizing pattern A cannot be normally detected, the sector terminal signal (b) is not, as shown in FIG. 11, raised to "H". If the reading VFO is normal, that is, if the reading VFO abnormal signal (e) is "L", the sector terminal is recognized in accordance with the count signal (d). The above-described count signal causes the write permission signal (f) to be raised to "H" similarly to the above-described case so that data is written. Since the above-described count signal is generated without exception, the sector terminal portion can be recognized assuredly.

If the synchronizing pattern A cannot be normally detected and as well as the reading VFO is abnormal, the count signal (d) is output faster than the terminal of the synchronizing pattern A in a case where, for example, the frequency of the reading VFO is short. However, since the reading VFO abnormal signal (e) is raised to "H" in this state, it is not recognized as a normal sector terminal so that data is not written. As a result, the erroneous writing can be prevented if the leading VFO is abnormal.

Similarly to the first embodiment, the phase of the writing VFO signal for the writing operation is compensated by the delay compensating circuit 16. In a case where the synchronizing pattern A is not normally detected and thereby the sector terminal signal is not generated, the phase of the writing VFO signal may be compensated by using the count signal.

The writing VFO signal, the phase of which has been adjusted in accordance with the preset value, is supplied to the modulating circuit 19. Since data to be reloaded is supplied to the modulating circuit 19 from the control circuit 57, the modulating circuit 19 processes the modulated signal by utilizing the above-described writing VFO signal so as to output it to the laser diode drive circuit 20. The laser diode drive circuit 20 drives the laser diode in response to the above-described modulated signal so as to write data to be reloaded onto the optical card.

As described above, according to this embodiment, even if the final synchronizing pattern of the sector, on which data has been written at the preceding writing operation, cannot be detected, the sector terminal can be recognized. By compensating the phase of the writing VFO signal at the above-described sector terminal in accordance with the quantity of the circuit delay, the bit deviation can be prevented because the junction of the sectors can be joined smoothly. Furthermore, data can be reloaded continuously from the recording area onto which data has been recorded at the preceding recording operation. As a result, the time taken to complete writing of data can be shortened and the recording efficiency can be improved.

Figure 13:
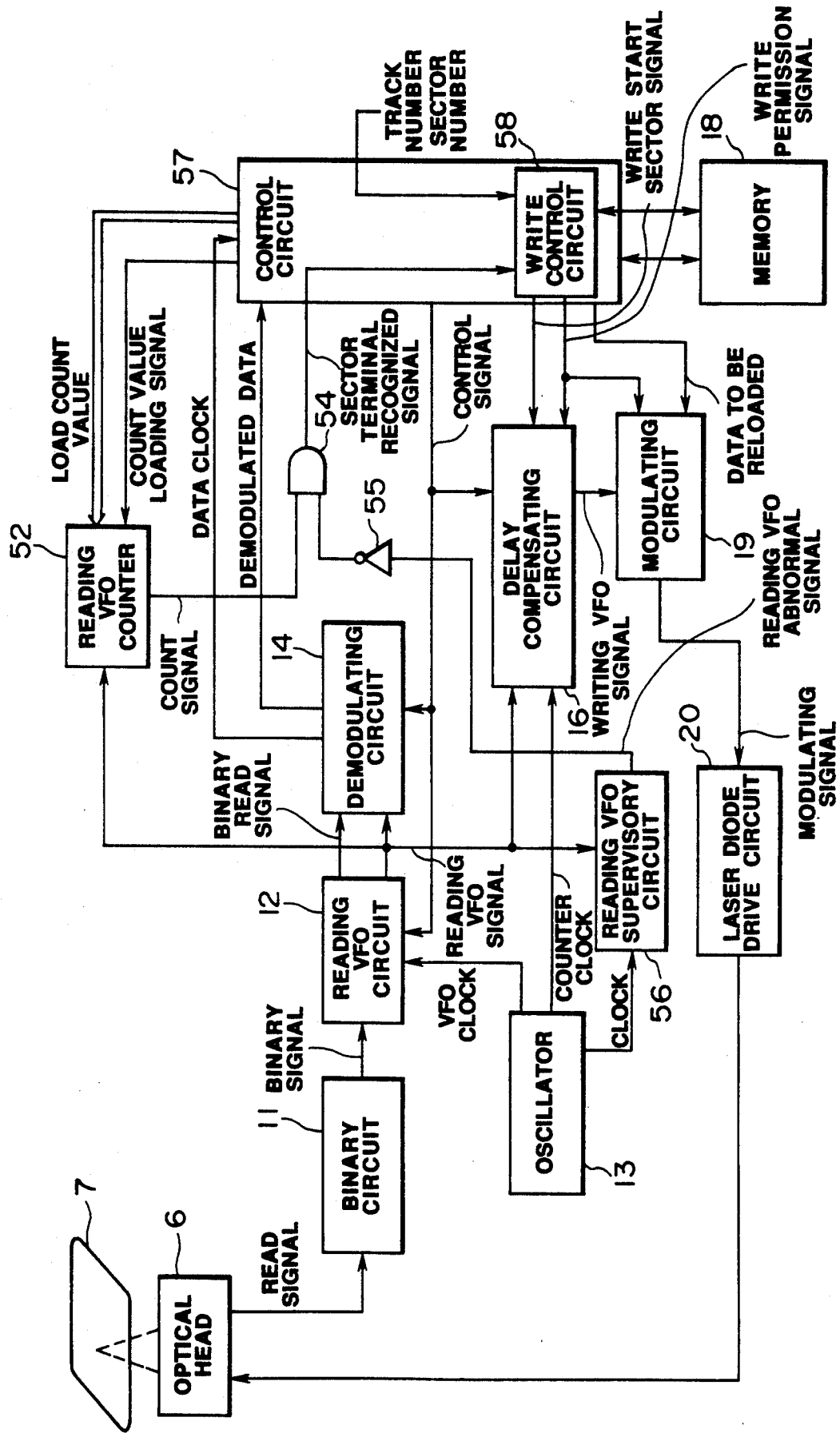

FIGS. 13 to 15 illustrate a fourth embodiment of the present invention. FIG. 13 is a block diagram which illustrates the structure of a circuit for use in the optical recording/reproducing apparatus. FIGS. 14 and 15 respectively are timing charts for illustrating the operation of sector terminal recognizing means.

According to the fourth embodiment of the present invention, the sector terminal recognizing means is constituted by the reading VFO counter 52, the reading VFO supervising circuit 56, the AND circuit 56 and the NOT circuit 55 so that the terminal of the sector can be recognized. The other structure is arranged similarly to the third embodiment.

The above-described sector terminal portion recognizing means recognizes the terminal portion of the sector on which data has been written at the preceding writing operation so as to output the sector terminal recognizing signal. As a result, data to be reloaded can be written starting from the sector terminal.

Similarly to the third embodiment, the control circuit 57 latches the demodulated data at the timing of the data clock so that the CRC check is performed in which it is detected whether or not the assigned track number and the sector number and those denoted by the demodulated data respectively coincide with each other. If they respectively coincide with each other, the write start sector signal (a) of "H" is output at the start timing of the synchronizing pattern A of the track format (g) as shown in FIG. 14. At this time, the control circuit 57 outputs the load count value and the count value loading signal (c) to the reading VFO counter 52.

In this state, the reading VFO counter 52 counts down the value which corresponds to the period of the synchronizing pattern A while using the reading VFO signal as the clock. When the count value is zero, the reading VFO counter 52 generates the count signal (d). At this time, the frequency of the above-described reading VFO is supervised by the reading VFO supervising circuit 56. If it is normal, the reading VFO abnormal signal (e) is lowered to "L". The above-described count signal is output to the control circuit 58 via the AND circuit 54.

When the sector terminal portion is recognized depending upon a fact that the count signal has been output in a period in which the above-described write start sector signal is "H", the write permission signal (f), which permits data writing by the write control circuit 58 at the timing of the sector terminal, is raised to "H" so that data is written.

If the reading VFO is abnormal, the reading VFO abnormal signal (e) is raised to "H" as shown in FIG. 15. Therefore, a determination is not made that that it is the normal sector terminal. Therefore, the write permission signal (f) is not raised to "H" in response to the abovedescribed count signal. As a result, data is not written. Consequently, if the reading VFO is abnormal, erroneous data writing can be prevented.

As described above, according to the fourth embodiment, although the structure is simple, the terminal of the sector can be recognized if the final synchronizing pattern of the sector, on which data has been written at the preceding writing operation, is not detected. Therefore, data can be reloaded continuously from the preceding writing operation while preventing the erroneous data writing.

The other operations and effects are the same as those obtainable from the third embodiment.

The calculation of the logical sum and the logical product performed for the purpose of recognizing the sector terminal may be carried out in the control circuit 57. The circuit structure for demodulating data or generating the modulation signal for writing data is not limited to that according to this embodiment.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A reloadable optical recording/reproducing apparatus for reloading data continuously from a recording area of a recording medium, onto which data has been recorded at the preceding recording operation, in accordance with the same modulating rule, said reloadable optical recording/reproducing apparatus comprising:
   a VFO circuit in which a reading VFO signal is obtained from a read signal obtained from a scanning of an optical card by an optical head;
   a demodulating circuit for demodulating said read signal and outputting said demodulated read signal;
   sector terminal portion recognizing means for detecting a terminal portion of said recording area, onto which data has been recorded at the preceding recording operation, from said demodulated read signal, and outputting a sector terminal recognizing signal;
   delay compensating means for advancing the phase of said reading VFO signal at a timing determined by said sector terminal recognizing signal so as to output it as a writing VFO signal; and
   modulating means for modulating data to be reloaded in accordance with said writing VFO signal so as to drive a laser diode in said optical head to write said data.

2. A reloadable optical recording/reproducing apparatus for reloading data continuously from a recording area of a recording medium, onto which data has been recorded at the preceding recording operation, in accordance with the same modulating rule, said reloadable optical recording/reproducing apparatus comprising:
   a VFO circuit in which a reading VFO signal is obtained from a read signal obtained from a scanning of an optical card by an optical head;
   a demodulating circuit for demodulating said read signal and outputting said demodulated read signal;
   terminal portion recognizing circuit for detecting a synchronizing pattern of a terminal portion of said recording area, onto which data has been recorded at the preceding recording operation, from said demodulated read signal, and outputting a terminal recognizing signal;
   a control circuit for detecting a track number and a sector number from said demodulated read signal and for outputting a write start sector signal in a period of said synchronizing pattern when the track number and the sector number denoted by said demodulated read signal and a track number and a sector number onto which data is reloaded, respectively, coincide with each other, and wherein said control circuit outputs a write permission signal from a moment at which said write start sector signal and said terminal recognizing signal have been output;
   delay compensating means connected to said control circuit and said terminal portion recognizing circuit for advancing the phase of said reading VFO signal at a timing in accordance with said terminal recognizing signal input from said terminal portion recognizing circuit in a period in which said write permission signal input from said control circuit is generated based on the level of said write start sector signal input from said control circuit so as to output said write permission signal as a writing VFO signal; and
   modulating means for modulating data to be reloaded in accordance with said writing VFO signal so as to drive a laser diode in said optical head to write said data.

3. A reloadable optical recording/reproducing apparatus according to claim 1 or 2, wherein said delay compensating means includes a latch circuit for latching said terminal signal at a last transition timing of said reading VFO signal as a load or a count mode signal;
   a counter for loading a preset value, which corresponds to a circuit delay, in response to said latch mode signal, commencing counting from said preset value in response to said count mode signal; and
   an OR circuit having an output for inverting an output of said counter whenever counting is completed so as to output it as said writing VFO signal.

4. A reloadable optical recording/reproducing apparatus according to claim 3, wherein said counter counts counter clock pulses which are obtained by dividing the period of said reading VFO signal by 100.

5. A reloadable optical recording/reproducing apparatus according to claim 3, wherein said counter includes a semicentenary counter for counting counter clock pulses, which are obtained by multiplying the period of said reading VFO signal by 100, so as to output carry signals whenever counting is completed,
  a timing signal generating circuit for outputting a timing signal after said semicentenary counter has counted a plurality of said counter clock pulses in a case where said quantity of said circuit delay is ½ period or 1 period of said reading VFO signal; and
  a binary counter and an OR circuit for inverting an output in response to said carry signal or timing signal;

6. A reloadable optical recording/reproducing apparatus according to claim 1, wherein said sector terminal recognizing means output said sector terminal recognizing signal at the terminal of said recording area onto which data has been recorded at said preceding recording operation.

7. A reloadable optical recording/reproducing apparatus according to claim 1, wherein said sector terminal recognizing means outputs said sector terminal recognizing signal at a position, by a predetermined bits, in front of the terminal of said recording area onto which data has been recorded at said preceding recording operation.

8. A reloadable optical recording/reproducing apparatus according to claim 2, wherein said terminal recognizing circuit detects all of bits of said synchronizing pattern at the terminal of said recording area onto which data has been recorded at said preceding recording operation.

9. A reloadable optical recording/reproducing apparatus according to claim 2, wherein said terminal recognizing circuit includes an all bit synchronizing pattern detecting circuit for detecting all of the bits of said synchronizing pattern at the terminal of said recording area onto which data has been recorded at said recording operation and outputting a detection signal;
  a predetermined bit synchronizing pattern detecting circuit for detecting said synchronizing pattern to a predetermined bit and outputting a detection signal; and
  a selection circuit which selects the output from said predetermined bit synchronizing pattern detecting circuit in a period in which said write start sector signal is being output and which selects the output from said all bit synchronizing pattern detecting circuit in a period in which said write start sector signal is not output so as to output it as said terminal signal.

10. A reloadable optical recording/reproducing reproducing apparatus for reloading data continuously from a recording area of a recording medium, onto which data has been recorded at the preceding recording operation, in accordance with the same modulating rule, said reloadable optical recording/reproducing apparatus comprising:
  a VFO circuit in which a reading VFO signal is obtained from a read signal obtained from a scanning of an optical card by an optical head;
  a demodulating circuit for demodulating said read signal and outputting said demodulated read signal;
  sector terminal portion recognizing means for detecting a terminal portion of said recording area, onto which data has been recorded at the preceding recording operation, from said demodulated read signal and outputting a sector terminal signal;
  a write control means for detecting a track number and a sector number from said demodulation read signal, and for outputting a write start sector signal in a period of said synchronizing pattern at a terminal portion of said recording area when the track number and the sector number denoted by said demodulated read signal and a track number and a sector number onto which data is reloaded, respectively, coincide with each other and, wherein said write control means outputs a write permission signal from a moment at which said write start sector signal and said sector terminal signal have been output;
  delay compensating means connected to said write control means and said sector terminal portion recognizing means for advancing the phase of said reading VFO signal at a timing in accordance with said sector terminal recognizing signal output from said sector terminal portion recognizing means in a period in which said write permission signal input from said control means is generated based on the level of such write start sector signal input from said control signal so as to output said write permission signal as said writing VFO signal; and
  modulating means for modulating data to be reloaded in accordance with said writing VFO signal so as to drive a laser diode in said optical head to write said data.

11. A reloadable optical recording/reproducing apparatus according to claim 1 or 10, wherein said sector terminal recognizing means includes reading VFO count means for detecting the terminal of said recording area onto which data has been recorded at said preceding operation by counting said reading VFO signal and for outputting a count signal;
  reading VFO supervising means for supervising the frequency of said reading VFO signal and for outputting an abnormal signal if said frequency is not included in a predetermined allowable range, whereby, if said abnormal signal is not output, the terminal of said sector is recognized by at least is a count signal so as to output a sector terminal recognizing signal.

12. A reloadable optical recording/reproducing apparatus according to claim 10, wherein said sector terminal recognizing means includes reading VFO signal from a first transition timing of said write start sector signal and outputting a count signal when counting up to a predetermined value is made, which corresponds to the terminal of said recording area, has been completed; and
  reading VFO supervising means for supervising the frequency of said reading VFO signal and outputting an abnormal signal when said frequency is not included in a predetermined allowable range, whereby, if said abnormal signal is not output, the terminal of said sector is recognized by at least said count signal so as to output a sector terminal recognizing signal.

13. A reloadable optical recording/reproducing apparatus according to claim 10, wherein said sector terminal recognizing means includes reading VFO count means for counting said reading VFO signal from a first transition timing of said write start sector signal and outputting a count signal when counting up to a predetermined value is made, which corresponds to the terminal of said recording area, has been completed;

terminal detecting circuit for detecting the synchronizing patter of the terminal of said recording area, onto which data has been recorded at the preceding recording operation, from said demodulated data and outputting a terminal signal; and reading VFO supervising means for supervising the frequency of said reading VFO signal and outputting an abnormal signal when said frequency is not included in a predetermined range, whereby, if said abnormal signal is not output, the sector terminal is recognized in accordance with said terminal signal or said count signal so as to output a sector terminal recognizing signal.

14. A reloadable optical recording/reproducing apparatus according to claim 10, wherein said sector terminal recognizing means includes reading VFO count means for counting said reading VFO signal from a first transition timing of said write start sector signal and outputting a count signal when counting up to a predetermined value is made, which corresponds to the terminal of said recording area, has been completed;

reading VFO supervising means for supervising the frequency of said reading VFO signal and outputting an abnormal signal when said frequency is not included in a predetermined range, whereby, if said abnormal signal is not output, the sector terminal is recognized in accordance with said count signal so as to output a sector terminal recognizing signal.

* * * * *